United States Patent [19]

Katagiri et al.

[11] 4,399,735

[45] Aug. 23, 1983

[54] BRAKE BOOSTER

[75] Inventors: Masayoshi Katagiri, Toyota; Osamu Ogura, Nagoya; Takashi Fujii, Toyota, all of Japan

[73] Assignees: Toyota Jidosha Kogyo Kabushiki Kaisha; Aisin Seiki Kabushiki Kaisha, both of Aichi, Japan

[21] Appl. No.: 194,404

[22] Filed: Oct. 6, 1980

[30] Foreign Application Priority Data

Nov. 21, 1979 [JP] Japan .................. 54-151238

[51] Int. Cl.³ .............................................. F15B 9/10
[52] U.S. Cl. .................................. 91/369 B; 91/374; 91/369 A
[58] Field of Search ............. 91/369 A, 369 B, 369 R, 91/376 R, 374

[56] References Cited

U.S. PATENT DOCUMENTS 4,192,220 3/1980 Tateoka .......................... 91/369 B
4,242,943 1/1981 Nakamura et al. .............. 91/369 B

FOREIGN PATENT DOCUMENTS 2027144 2/1980 United Kingdom ............. 91/369 B

Primary Examiner—Paul E. Maslousky
Attorney, Agent, or Firm—Parkhurst & Oliff

[57] ABSTRACT

A brake booster of stroke-enlarging type which includes a casing, a power piston so disposed as to divide the interior of the casing into two chambers for being actuated by the difference of pressure in the two chambers, a control piston, containing therein a valve mechanism for controlling the difference of pressure in the two chambers and a transmission mechanism for transmitting an input of an input member to an output member, being coaxially fitted into a central bore of the power piston relatively movably thereto and a reaction lever, which is abutted at an output portion in the middle thereof by the output member, receiving output of the transmission mechanism and output of the power piston respectively as an input at a first input portion and a second input portion thereof located on either side of said output portion in the middle, whereby a greater stroke can be obtained at the output member than a stroke input at the input member. Between the control piston and the power piston a locking mechanism including a ball and a ball retainer is disposed. The ball retainer is for transmitting an output of the power piston to the reaction lever via the ball, through abutment on a first input portion of the reaction lever. After the ball has been locked between the power piston and the control piston a reactionary force which comes from the reaction lever back to the ball retainer is mostly transmitted from the ball to the control piston, not to the power piston. Therefore the power piston is not pushed back even after the peak of the assisting force given to the power piston by the pressure difference.

12 Claims, 8 Drawing Figures

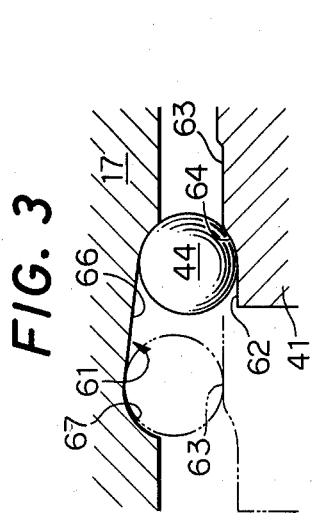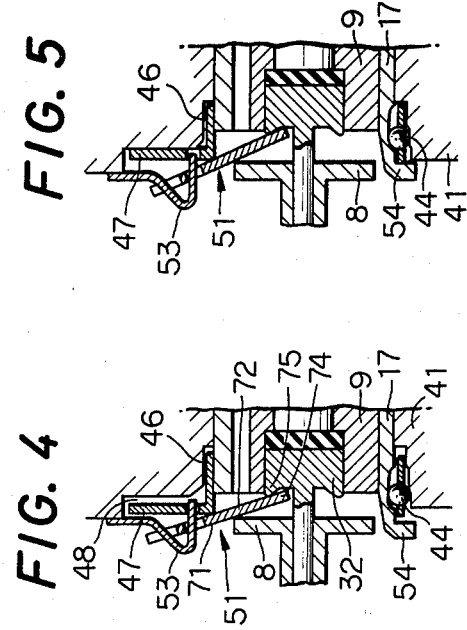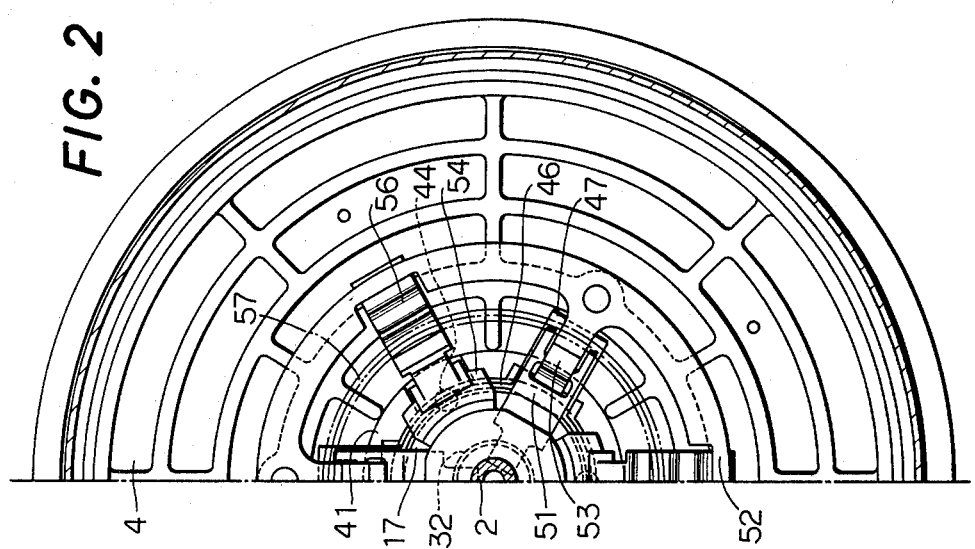

BRAKE BOOSTER

FIELD OF THE INVENTION

This invention relates to a brake booster for boosting brake operational force by utilizing gaseous pressure, and more particularly to an improvement of a stroke-enlarging type brake booster.

BACKGROUND OF THE INVENTION

A stroke-enlarging type brake booster mentioned herein means one wherein a power piston, which is so disposed in a booster casing as to divide the interior of the same into two chambers and actuated by a pressure difference between the two chambers, is separated from a controlling mechanism for controlling the pressure difference upon operation of an input member for being relatively movable to the controlling mechanism. This stroke-enlarging type brake booster is featured in obtaining a larger output stroke than the input stroke, while in ordinary brake boosters the output stroke can never be larger than the input stroke.

The stroke-enlarging type brake booster is still disadvantageous, when there is a certain limit in a assisting or promoting force, i.e., a force produced by the difference of pressure on opposite sides of the power piston, in that an attempt of getting a larger output than a critical output obtained at the upper limit of the assisting force results in a temporary rapid increasing of the pedal stroke (an input stroke) without a resultant increase of the braking force.

Two of the applicants of this invention earlier filed a patent application for a development capable of eliminating this disadvantage, in the United States, Serial Number of which is 71,489 (now, U.S. Pat. No. 4,287,811). In the brake booster of this type two of the undermentioned members are disposed on either one of the power piston and a control piston, which is a part of the controlling mechanism, (a) a locking member movably retained substantially perpendicular to the direction of the movement of the two pistons, operated between the forwardly advanced position and the backwardly retracted position owing to the pressure difference between the two chambers of the power piston, and engaged with an engaging portion formed on the other of the two pistons so as to block the relative movement of both pistons, and (b) an elasticity device constantly retaining the locking member at the backwardly retracted position, and allowing the locking member to advance, when the pressure difference between the two chambers exceeds a predetermined value, to the forwardly advanced position to engage the engaging portion.

For movably retaining the locking member, however, either one of the power piston and the control piston must be made to be considerably large, and chambers on opposite sides of the locking member and the chambers on opposite sides of the power piston must be communicated with passages purposely arranged, which inevitably makes the structure of the locking mechanism complicated. As the locking member is engaged with or released from the engaging portion due to the comparative magnitude between the force created from the pressure difference between the two chambers thereof and the elastic force of the elasticity device, there is a disadvantageous tendency of delaying the operation.

SUMMARY OF THE INVENTION

The present invention was made aiming at the provision of a stroke-enlarging type brake booster having a highly reliable locking mechanism simple in structure and causing no delay in operation. The essence of the invention can be summarized as follows: (A) between the power piston and the control piston is interposed a ball free-rotatably retained in a ball retainer; (B) in the external peripheral surface of the control piston is formed a ball accommodating recess, whose bottom surface includes a portion progressively deepened in the forward direction; (C) the internal peripheral surface of the power piston includes (i) a ball driving surface for advancing the ball together with the power piston, when the latter is advanced, and (ii) a ball locking surface, parallel to the axis of the control piston, for preventing the ball from moving in a departing direction away from the axis of the control piston, when the ball is accommodated in a deep portion of the ball accommodating recess after the advancing of the power piston to the forwardmost position in relation to the control piston; and (D) the forward end of the ball retainer is abutted on a first input portion of a reaction lever, whereby the output of the power piston is transmitted, via the ball retainer, to the reaction lever, and when the power piston is in the forwardmost position the reactionary force, which is transmitted from the output member, via the reaction lever, to the ball retainer, is transmitted through the engagement of the ball and the bottom surface of the ball accommodating recess to the control piston without being transmitted to the power piston.

The brake booster of this invention is quite effective in preventing the occurrence of the aforementioned idle stroke of the brake pedal after the assisting force has reached its limit, in spite of its extremely simple structure, by ingeniously eliminating the delay of operation inherent to the earlier developed boosters, because the ball retainer is prevented, after the advancement of the power piston, from retracting by the engagement of the ball with the slant surface forwardly inclined on the control piston, and the power piston can not be pushed backwards even after the assisting force has reached its critical limit.

A brake booster in accordance with this invention is constructed, in its preferable mode, including the undermentioned parts and mechanisms: (a) a casing, (b) an input member for inputting the brake operational force, (c) an output member for outputting the boosted force, (d) a power piston so disposed as to divide the interior of the casing into two chambers, being constantly biased to a retracted position by spring means, and actuated by the difference of the pressure between the two chambers to be advanced forwardly resisting the action of the spring means, (e) a control piston so fitted in a central bore of the power piston so as to be relatively movable thereto for a pre-limited distance, constantly retained at a retraced position by spring means, and occasionally advanced integrally with the power piston, after the pre-limited distance of the relative movement has been achieved by the advancement of the power piston, (f) a control valve (valve mechanism), disposed between the control piston and the input member, and actuated by relative movement between the control piston and the input member for controlling the difference of the pressure between opposite sides of the power piston, (g) a transmission mechanism transmitting the force applied by the control piston and the input member, while allowing on the other hand a relative movement between the control piston and the input member, (h) a reaction lever in abutment on the output member, at an output portion in the middle thereof, one of two input portions thereof located on opposite sides of the output portion being in abutment on the output portion of the transmission mechanism, (i) a ball retainer interposed between the power piston and the control piston, and abutting at the forwardmost end thereof on a second input portion of the reaction lever, (j) at least one ball retained in the ball retainer, (k) a ball accommodating recess formed on the external peripheral surface of the control piston such that the bottom surface is progressively deepened in the forward direction, and (l) two kinds of surfaces formed on the internal peripheral surface of the power piston, one being a ball driving surface for advancing the ball together with the power piston when the latter is advanced, and the other being a ball locking surface for preventing the ball, which has been accommodated in a deep portion of the ball accommodating recess when the power piston comes to the forwardmost position relatively to the control piston, from moving in the direction away from the axis of the control piston.

BRIEF DESCRIPTION OF THE DRAWINGS

FIG. 2 is a cross section of the embodiment shown in FIG. 1 taken along the section line II—II (left half is omitted);

FIG. 3 is an enlargement of an essential part in FIG. 1;

FIGS. 4 and 5 are respectively an explanatory view of an essential part of the embodiment shown in FIGS. 1 through 3 for illustrating the operational mode thereof.

DETAILED DESCRIPTION OF THE PREFERRED EMBODIMENTS

Detailed description on the preferred embodiments of this invention will be made hereinafter with reference to the appended drawings.

Figure 1:
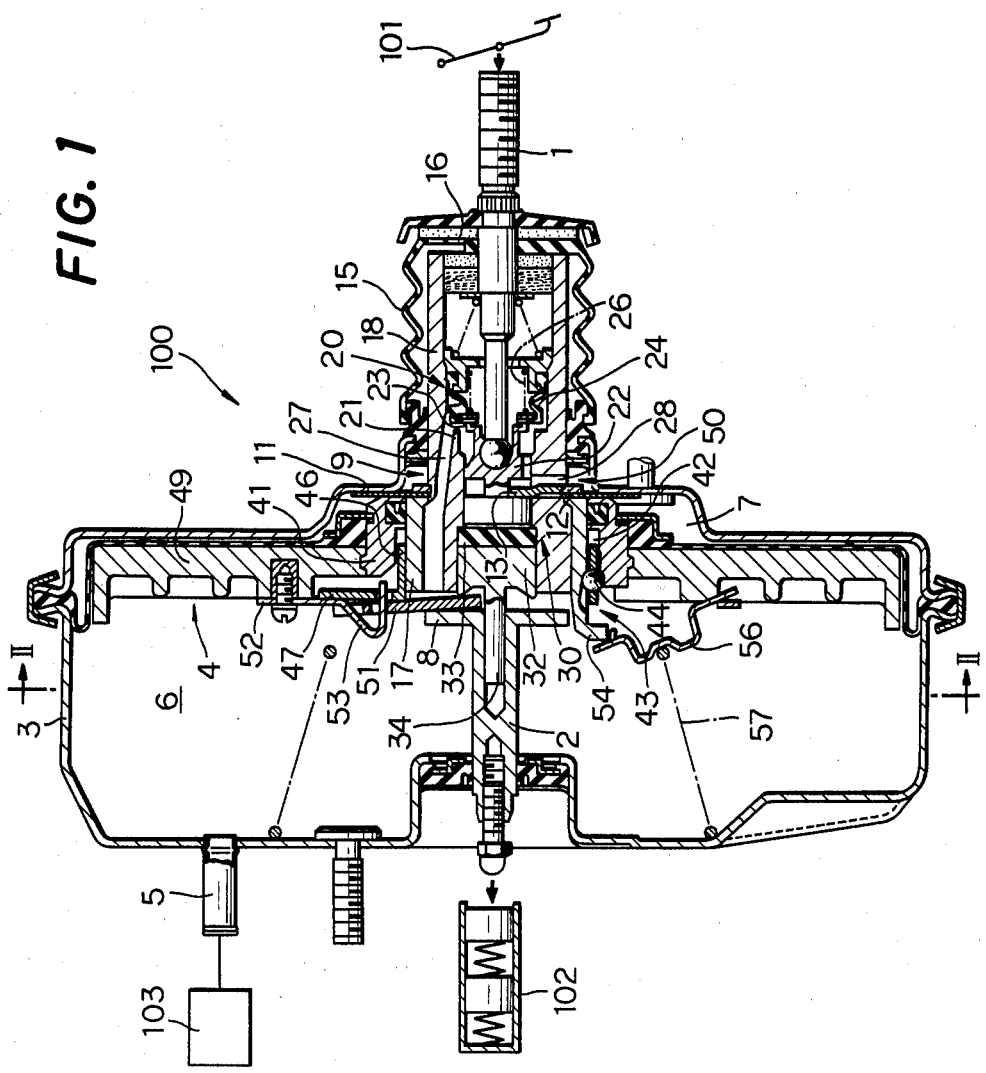
FIG. 1 is an elevational axial section of an embodiment of a booster in accordance with this invention.

A booster 100 shown in FIG. 1 is to boost an input force applied to an operating rod 1, an input member, before outputting the same from a push rod 2, an output member, to a master cylinder 102.

The booster 100 is provided with an air tight casing 3, whose inside is divided into two chambers by a power piston 4 of diaphragm type. The power piston 4 consists of a body portion 49 and an annular member 41 radially inwardly located. One of the two chambers divided by the power piston 4 constitutes a constant pressure chamber 6 which is under negative pressure, being connected to a vacuum source 103 such as an intake manifold of an engine or a vacuum pump by way of a pipe joint 5. The other chamber is a variable pressure chamber 7 which is variable in pressure by being selectively communicated to the constant pressure chamber 6 or the ambient atmosphere by a later described control valve.

In the middle part of the power piston 4 a controlling mechanism 50 is provided which consists of a control valve 20 (valve mechanism) and a transmission mechanism 30.

In other words, into a central bore of the power piston 4 a control piston 9 composed of a body 18 and a cylindrical member 17 secured on the external side of the body 18 is slidably fitted. The control valve 20 is composed of a first valve seat 21 formed on the control piston 9, a second valve seat 23 formed on a valve plunger 22 slidably fitted in the control piston 9, and a valve element 24 of elastic material disposed commonly to those two valve seats 21, 23. The valve element 24 is biased to both valve seats 21, 23 by the action of a compression spring 26. In the control piston 9 respective air inlet passage 27 and 28 communicating with the constant pressure chamber 6 and the variable pressure chamber 7 are formed. In a groove formed in communication with the air inlet passage 28 and wider than that, a stopper 13 is inserted to restrict the advancing end and the retracting end of the valve plunger 22. An E shape ring 12 prevents removing of the stopper 13 out of the inserted place. The E shape ring 12 simultaneously functions to lock a stopper plate 11 which is abuttable on the rear wall of the casing 3 for restricting the retracting end of the control piston 9. A projecting portion of the control piston 9 from the casing 3 is completely covered by a boot 15, whose end portion is provided with an air inlet port 16.

On the other hand, a first transmission mechanism 30 includes the valve plunger 22 fixed on the tip of the operating rod, a large plunger 32 fitted into the control piston 9, and a reaction disc 33 of rubber interposed between the valve plunger 22 and the large plunger 32. The reaction disc 33 functions, while allowing a slight relative movement of the valve plunger 22 and the control piston 9, to transmit the resultant force applied from both to the large plunger 32. The large plunger 32 is provided with a rod portion 34 projecting from the central part thereof for retaining the rear end of the push rod 2.

As shown in FIG. 1 and FIG. 2 (wherein right half only is illustrated because the left half is entirely symmetrical to the former), a circumferential clearance or gap 42 is left between the power piston 4 and the control piston 9 at a counter bore portion formed on the axially forward side of the power piston 4, wherein a ball retainer 43 for rotatably holding a plurality of balls 44, in this embodiment 3 in number, are accommodated.

More particularly, as illustrated in FIG. 3, on the external peripheral surface of the cylindrical member 17 there is formed a ball accommodating recess 61 of annular shape, which has a depth progressively increasing in the forward direction of advancement of the power piston 4, (left side in FIG. 3). In other words, the bottom of the ball accommodating recess 61 constitutes a tapered surface with a progressively diminishing diameter toward the forward (front) end. On the internal surface of the annular member 41, opposing the ball accommodating recess 61, there is formed another recess constituting a first counter-bore portion comprising an enlarged diameter portion 63 near the axially forward side of the annular member 41, a second counter-bored portion comprising an even further enlarged diameter portion 62 adjacent the forward side of first counter-bored portion 63, and a stepped or varying diameter portion 64 inbetween each counter-bored portion having a curvature equal to the diameter of the ball 44.

A ball retainer 43 which is a member of a second transmission mechanism is composed, as clearly shown in FIG. 2, of a cylindrical portion 46 of thin wall and three abutting flanges 47 extending radially outwardly at a right angle.

Three reaction levers 51 are interposed respectively between the three abutting flanges 47 and the large plunger 32, and a reaction plate 8 on the rear end of the push rod 2. To the power piston 4 is secured a lever retainer 52, generally of annular shape, provided with three bent pieces 53 extending toward the axis of the power piston 4. The bent pieces 53 are respectively bent as to form two sides of a triangle from the root to the tip thereof, and is engaged at its root portion with a notch formed at one end portion of each reaction lever 51, and furthermore is fitted at the tip portion thereof into an opening bored in the reaction lever 51 for retaining the same at a fixed position. The bent piece 53 is also abuttable on the abutting flange 47 of the ball retainer 43. And the cylindrical member 17 is provided on the forward end thereof with three outward flanges 54. Between the middle portion of each of three spring receivers 56, which is contacted at one end thereof with the flange 54 and inserted at the other end thereof between the power piston 4 and the lever retainer 52, and the forward wall of the casing 3 at the opposed position to the spring receiver 56 a compression coil spring 57 is spanned.

The operation of this embodiment will be explained hereunder. In a state of non-depressing of a brake pedal 101, the second valve seat 23 is in contact with the valve element 24 while the first valve seat 21 is not. Thus, the variable pressure chamber 17 is in communication with the constant pressure chamber 6 so to maintain both chambers 6, 7 at an equal negative pressure, producing no pressure difference between each side of the power piston 4. Both the power piston 4 and the control piston 9 are under the biasing force from the spring 57 via the spring receiver 56, rendering the stopper plate 11 abutted on the casing 3. The control piston 9 is kept at the retracted position by the abutment of the stopper plate 11 on the casing 3 and the power piston 4 is kept at the retracted position by the abutment on the stopper plate 11 as shown in FIG. 1.

A slight depressing of the brake pedal 101 in this state, with a slight forward advancing of the operating rod 1 (leftward movement in FIG. 1), makes the first valve seat 21 contact the valve element 24 by removing the second valve seat 23 therefrom. The variable pressure chamber 7 will be consequently separated from the constant pressure chamber 6 to be in communication with the ambient atmosphere. Between the constant pressure chamber 6 and the variable pressure chamber 7, where the air comes in from outside, a pressure difference is naturally created so as to push forward the power piston 4.

While the power piston 4 is in advancement, the ball retainer 43 is advanced forwardly by the force coming to the ball 44 via a driving surface, i.e. the surface of the stepped portion 64 of the annular member 41. By the advancing of the ball retainer 43 a force is applied on a second input portion 71 of the reaction lever 51 so as to cause the reaction lever 51 to be rotated by assuming an output portion 75 of the plunger 32, where a first input portion 74 of the reaction lever 51 is in contact, as the fulcrum, which results in imparting a driving force to the push rod 2 from a centrally-located output portion 72 of the reaction lever 51 via the reaction plate 8. Due to the driving force, braking fluid in the master cylinder 102 is supplied to the not-shown braking system, with a result of compensating the consumed fluid amount caused by the extinction of the brake clearance and the initial deformation of the piston cup and others. It means a much larger output stroke is obtained than the input stroke applied.

When the braking effect begins to appear due to the going out of existence of the brake clearance the forward end surface of the ball retainer 43 abuts, the flanges 54 of the cylindrical member 17 to stop the ball retainer 43 from advancing and the power piston 4 abuts the flanges 47 of the ball retainer 43, at a state shown in FIG. 5 and shown with a two-dot-chain line in FIG. 3. It is quite evident that the ball retainer 43 is in this state incapable of moving forwards in relation to the control piston 9, and it is prevented from moving backwards, too. The ball retainer 43 can be moved backwards only upon the outward movement of the balls 44 along the tapered bottom surface of the ball accommodating recess 61. However, the outward movement of the balls 44 is blocked by the ball locking surface, i.e., the internal surface of the small diametered portion 63 of the annular member 41. Both balls 44 and ball retainer 43 are thus restricted from moving either forwards or rearwards in relation to the control piston 9.

A mechanical locking observed in this embodiment has eliminated the operation delaying by taking advantage of the relative movement of the power piston 4 to the control piston 9. The interposed media between the two pistons (4, 9) in this case are the balls 44 and the ball retainer 43 alone, which contributes to reducing the size of the both pistons (4, 9) to minimum.

As can be understood from the above explanation, the ball accommodating recess 61 has only to be provided with the tapered surface 66 of the above-mentioned shape. The curved surface on the forward side, which allows elimination of the flange portion 54 as the stopper, may be eliminated.

When the ball retainer 43 has become relatively nonmovable to the control piston 9 the operating rod 1 advances, just like in a conventional brake booster, the push rod 2 while the operating rod 1 and the power piston 4 share the load at the ratio determined by both of the reaction lever 51 and the reaction disc 33.

If the brake pedal 101 is, after the limit of the pressure difference on opposite sides of the power piston has been reached, depressed strongly furthermore the first input portion 74 of the reaction lever 51 receives a major force from the output portion 75 of the large plunger 32 to cause the reaction lever 51 to be rotated, assuming the reaction plate 8 as the fulcrum on which the output portion 72 of the reaction lever 51 is abutted, so as to push the ball retainer 43 backwards. At this moment, however, the ball retainer 43 and the balls 44 are as mentioned earlier non-movable in relation to the control piston 9, imparting no force to the power piston 4 in the axial direction. It ensures that the power piston 4 is by no means retracted in relation to the control piston 9 under any pedal depressing force, no matter how large it may be to give the brake pedal 101 the idle stroke.

At this stage the valve plunger 22 is abutted on the stopper 13 to be restricted of its forward movement. After this abutment the operating rod 1, the valve plunger 22, the control piston 9, the large plunger 32, the reaction disc 33, the ball retainer 43, and the reaction lever 41 are all combined into an integral body to advance forward the push rod 2 via the reaction plate 8. The output stroke is increased at this stage in a same amount as the input stroke. Since the assisting force to the power piston 4 has already reached the limit at this moment the output of the booster can never be increased beyond the increase of the brake operational force.

Upon releasing of the depression of the brake pedal 101, the valve element 24 comes into contact with the second valve seat 23, leaving the first valve seat 21, rendering the variable pressure chamber 7 closely sealed by means of its separation from the ambient atmosphere and placing the same in communication with the constant pressure chamber 6 instead (see FIG. 1). No assisting force is applied in this state on the power piston 4. So the power piston is retracted under the biasing force from the spring 57 which is imparted by way of the spring receiver 56. By this retraction of the power piston 4 the locking of the balls 44 by the small diametered portion 63 is released to return the balls 44 to the state shown with a solid line in FIG. 3, along the reverse process when it was locked. When the ball 44 is not smoothly returned by any chance, it will be forcibly returned through the abutment of the bent pieces 55 of the lever retainer 52 on the flanges 47 of the ball retainer 43.

The route of the force transmission observed in the above-mentioned processes will be briefly explained hereunder.

(1) Assisting force:

Power piston 4→ball 44 (limited only in the initial stage of process. After the ball 44 has been locked the force will be imparted directly to the ball retainer 43)→ball retainer 43 (while the ball retainer 43 is not in abutment with the flange portion 54. After the abutment another route passing through the cylindrical member 17 and the transmission mechanism 30 will be added.)- →reaction lever 51→push rod 2.

(2) Operational force:

Operating rod 1→controlling mechanism 50→reaction lever 51→push rod 2.

The reactionary force coming from the master cylinder 102 will be transmitted to the power piston 4 and the operating rod 1 taking the right reverse route to those shown in (1) and (2).

The above description is concerned only to an embodiment of this invention, which should never be understood to be limited thereto.

Figure 6:
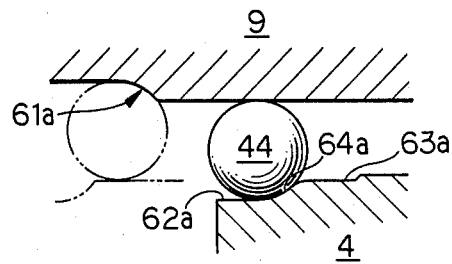
FIGS. 6-8 are respectively an enlargement corresponding to FIG. 3 of a ball driving surface and a ball accommodating recess in a different mode.
Figure 7:
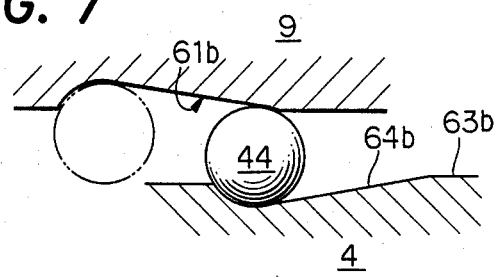
Figure 8:
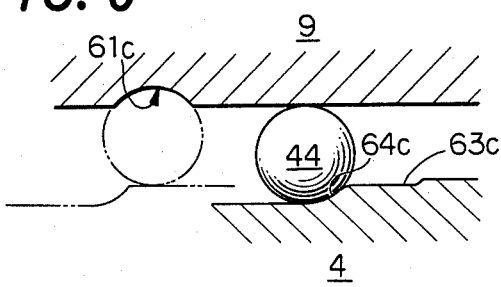

For example, the ball accommodating recess and the driving surface as well as the ball locking surface which are formed on the control piston 9 and the power piston 4 may be varied as those in FIGS. 6 through 8.

In the form shown in FIG. 6 the ball driving surface 64a and a ball locking surface 63a are both identical to those shown in FIG. 3, and the ball accommodating recess 61a is defined by a small diametered portion, which is formed on the axially forward portion of the control piston 9 by diminishing the diameter thereof, and a bridging or varying diameter portion which gently and smoothly bridges the small diametered portion and a remaining large diameter portion of the control piston 9. In the form shown in FIG. 7 the ball accommodating recess 61b is gentler in its taper in comparison to the ball accommodating recess 61 in FIG. 3, and the ball driving surface 64b is a tapered inner surface defining a progressively increasing internal diameter in the forward direction, on the internal surface of the power piston 4. And the form shown in FIG. 8 the ball driving surface 64c and the ball locking surface 63c are similar to those shown in FIG. 3, and the ball accommodating recess 61c is a simple annular groove having a cross section of an arcuate shape whose radius of arc is almost identical to that of the ball 44.

As a medium for transmitting, while allowing the relative movement between the control piston 9 and the valve plunger 22, a resultant force of both to the large plunger 32 the reaction disc 33 earlier mentioned is preferable, but it may be replaced by a lever or the like. Even omitting the same, as disclosed in U.S. Pat. No. 4,100,839 is also possible.

As an assisting force given to the power piston 4 the pressure difference created between the pressure of the ambient atmosphere and a positive pressure is preferable, but that created between a chamber constantly set at the ambient atmospheric pressure and another chamber which is selectively set at the ambient atmospheric pressure or a negative pressure is also allowed.

This invention is also applicable to a stroke-enlarging type brake booster, wherein a compression spring is spanned between the power piston and the control piston, which is disclosed in TOKU-KAI-SHO-54(1979)-99875 (Japanese Patent Application laid open to public).

It goes without saying that further modifications and variations can be made for those skilled in the art within the spirit and scope of this invention described in the following claims.

What is claimed is:

1. In a brake booster in which an output stroke of an output member is greater than an input stroke of an input member and which comprises (a) a casing, (b) a power piston axially movably disposed in said casing between said input and output members to divide an interior space of said casing into two pressure chambers, said power piston being actuated by a pressure difference between said two pressure chambers and having an internal surface defining an axially formed central bore, (c) a control piston having an external peripheral surface, and containing therein a control valve mechanism for controlling said pressure difference and further having a first transmission mechanism for transmitting an input force from said input member toward said output member, said control piston being coaxially received in said central bore and axially movable relative to said power piston, and (d) a reaction lever having an intermediate output portion, and first and second input portions located on opposite sides of said output portion, said first and second input portions receiving output forces of said first transmission mechanism and said power piston, respectively, said output portion abutting on said output member, an improvement comprising:

a second transmission mechanism including at least one ball associated with the external peripheral surface of said control piston and the internal peripheral surface of said power piston defining said central bore, and a ball retainer axially movably disposed and loosely retaining said at least one ball, said ball retainer abutting, on said second input portion of said reaction lever, said external peripheral surface having a recess whose depth increases progressively in the direction of advancement of said power piston toward said output member, said internal peripheral surface including a ball driving surface and further including a ball locking surface, said at least one ball engaging said driving and locking surfaces such that said driving surface drives said at least one ball together with said power piston while said power piston is advanced relative to said control piston and such that said locking surface prevents said at least one ball from radially outwardly moving off the bottom surface of said recess after said power piston is advanced through a predetermined distance, whereby, in an initial operating stage of said booster, the output force of said power piston is transmitted to said reaction lever via said at least one ball and said ball retainer, and after the predetermined distance of advancement of said power piston and the resultant locking of said at least one ball between said locking surface and the bottom surface defining the part of said recess, a reactionary force from said output member is transmitted to said control piston but not to said power piston.

2. A brake booster as claimed in claim 1, wherein said recess is an annular groove having a tapered bottom surface which has a diameter progressively diminishing in said direction of advancement, said ball driving surface is defined by a first stepped bore whose diameter changes, and said ball locking surface is defined by a second stepped bore.

3. A brake booster comprising:
a casing;
an axially movable input member for receiving an input force;
an axially movable output member for providing a boosted output force;
a power piston axially movably disposed in said casing between said input and output members to divide an interior space of said casing into two pressure chambers, said power piston having an internal peripheral surface, and being spring-biased toward a retracted position thereof, and moved against the biasing force to an advanced position thereof in response to pressure difference between said two pressure chambers, said power piston having an axially formed central bore;
a control piston coaxially received in said central bore and spring-biased toward a retracted position thereof, said control piston having an external peripheral surface and being axially movable over a predetermined distance relative to said power piston, and being fixed to said power piston after said predetermined distance of relative movement thereof is achieved through the advancement of said power piston to said advanced position;
a control valve disposed in association with said input member and said control piston, and actuated by relative movement between said input member and said control piston for controlling said pressure difference;
a first transmission mechanism disposed within said control piston for transmitting forces from said input member and said control piston toward said output member;
a reaction lever having an intermediate output portion, and first and second input portions on opposite sides of said output portion, said output portion abutting on said output member, and said first input portion abutting on an output portion of said first transmission mechanism; and
a second transmission mechanism including a ball retainer axially movably disposed between said power piston and said control piston and abutting at its axially forward end, on said second input portion of said reaction lever, said second transmission mechanism further including at least one ball loosely retained in said ball retainer and associated with the external peripheral surface of said control piston and the internal peripheral surface of said power piston defining said central bore, said external peripheral surface having a recess whose depth increases progressively in the direction of advancement of said power piston, said internal peripheral surface including a ball driving surface for advancing said ball together with said power piston while said power piston is moved to said advanced position, and further including a ball locking surface for preventing said ball from moving radially outward off the bottom surface of said recess after said power piston is located at said advanced position.

4. A brake booster as claimed in claim 3, wherein the central bore of said power piston is a stepped bore which has a counterbored portion on the axially forward side of said power piston, and said ball retainer is accommodated in an annular space formed between said external peripheral surface and a part of said internal surface defining said counterbored portion of said stepped bore.

5. A brake booster as claimed in claim 4, wherein said recess is an annular groove having a tapered bottom surface which has a diameter progressively diminishing in the direction of advancement of said power piston.

6. A brake booster as claimed in claim 4, wherein said recess is defined by a small diameter portion of said external peripheral surface on the axially forward part of said control piston, and by a varying diameter portion which gently and smoothly bridges said small diameter portion and a large diameter portion of said external peripheral surface on the remaining part of said control piston.

7. A brake booster as claimed in claim 4, wherein said recess is an annular groove whose cross section is of arcuate shape having a radius of arc almost identical to that of said ball.

8. A brake booster as claimed in claim 4, wherein the axially forward end part of said counterbored portion is further counterbored to provide a second counterbored portion which includes a stepped portion formed at the axially rear end of said second counterbored portion, said ball driving surface being defined by said stepped portion.

9. A brake booster as claimed in claim 4, wherein said counterbored portion has a tapered inner surface defining an internal diameter progressively increasing in said direction of advancement, said ball driving surface being defined by said tapered inner surface.

10. A brake booster as claimed in claim 3, wherein said at least one ball comprises at least three balls installed at three positions circumferentially equally spaced in said ball retainer.

11. A brake booster as claimed in claim 3, wherein said control piston is provided at the axially forward end thereof with at least one radially outwardly extending flange which functions as a stopper defining an end limit of the advancement of said ball retainer.

12. A brake booster as claimed in claim 3, wherein said ball retainer is a cylindrical member provided with at least one radially formed through-bore retaining said at least one ball, said cylindrical member including at least one flange radially outwardly extending from the forward end thereof and functioning as a stopper abutting on said power piston and defining an end limit of the advancement of said power piston relative to said control piston.

* * * * *